United States Patent
Ting (10) Patent No.: US 11,061,916 B1
(45) Date of Patent: Jul. 13, 2021

(54) COMPUTING APPROXIMATE DISTINCT COUNTS FOR LARGE DATASETS

(71) Applicant: Tableau Software, Inc., Seattle, WA (US)

(72) Inventor: Daniel Ting, Edmonds, WA (US)

(73) Assignee: TABLEAU SOFTWARE, INC., Seattle, WA (US)

(*) Notice: Subject to any disclaimer, the term of this patent is extended or adjusted under 35 U.S.C. 154(b) by 102 days.

(21) Appl. No.: 16/664,715

(22) Filed: Oct. 25, 2019

Related U.S. Application Data (60) Provisional application No. 62/750,760, filed on Oct. 25, 2018.

(51) Int. Cl.
| | | |
|---|---|---|
| *G06F 16/24* | (2019.01) | |
| *G06F 16/2458* | (2019.01) | |
| *G06F 16/2455* | (2019.01) | |

(52) U.S. Cl.
CPC .... *G06F 16/2465* (2019.01); *G06F 16/24558* (2019.01)

(58) Field of Classification Search
None
See application file for complete search history.

(56) References Cited

U.S. PATENT DOCUMENTS

| | | | | |
|---|---|---|---|---|
| 7,103,608 B1* | 9/2006 | Ozbutun | ........... | G06F 16/24557 707/604 |
| 8,065,309 B1* | 11/2011 | Bar-Yossef | ....... | G06F 16/90335 707/747 |
| 10,055,506 B2* | 8/2018 | Rhodes | ................. | G06F 16/958 |
| 2008/0059492 A1* | 3/2008 | Tarin | ..................... | G06F 16/221 |
| 2010/0299339 A1* | 11/2010 | Kementsietsidis | ..... | G06F 16/22 707/759 |
| 2014/0067751 A1* | 3/2014 | Ketkar | ................ | G06F 16/2462 707/602 |
| 2014/0229464 A1* | 8/2014 | Milenova | ............ | G06F 16/2455 707/718 |
| 2016/0124960 A1* | 5/2016 | Moser | ................... | G06F 16/248 707/723 |
| 2018/0096417 A1* | 4/2018 | Cook | .................... | G06F 16/953 |

* cited by examiner

*Primary Examiner* — Son T Hoang
(74) *Attorney, Agent, or Firm* — Morgan, Lewis & Bockius LLP (57) ABSTRACT

A method estimates counts of distinct items. A system allocates a matrix B in memory and receives a data stream including many data items. Each item includes a set of query fields and a set of identifier fields. For each item, the system computes a row for the data item by hashing data values of the identifier fields. The system also computes a column for the data item by hashing a combination of data values of the query fields and the row. The system computes a bin value for the item by hashing data values of the identifier fields. The system updates the matrix B by computing B[r,c]=max (v, B[r,c]). Subsequently, the system receives a query key value. For each row in the matrix B, the system computes a column, and estimates the number of data items from the data stream matching the query key.

20 Claims, 7 Drawing Sheets

|  | C1 | C2 | C3 | C4 | C5 | C6 | C7 | C8 | C9 | C10 |
|---|---|---|---|---|---|---|---|---|---|---|
| BS1 |  |  | QK1 |  |  |  |  |  |  |  |
| BS2 |  |  |  |  | QK1 |  |  |  |  |  |
| BS3 |  |  | QK1 |  |  |  |  |  |  |  |
| BS4 |  |  |  |  |  |  |  | QK1 |  |  |
| BS5 |  |  |  |  |  |  |  |  |  |  |

Figure 9

|  | C1 | C2 | C3 | C4 | C5 | C6 | C7 | C8 | C9 | C10 |
|---|---|---|---|---|---|---|---|---|---|---|
| BS1 |  |  | QK1 / QK2 |  |  |  |  |  |  |  |
| BS2 |  |  |  |  |  | QK1 |  | QK2 |  |  |
| BS3 |  |  |  |  |  |  |  |  |  |  |
| BS4 |  |  |  |  |  |  |  | QK1 |  |  |
| BS5 |  |  |  | QK2 |  |  |  |  |  |  |

Figure 10

COMPUTING APPROXIMATE DISTINCT COUNTS FOR LARGE DATASETS

RELATED APPLICATIONS

This application claims priority to U.S. Provisional Application Ser. No. 62/750,760, filed Oct. 25, 2018, entitled "Concurrently Computing Large Numbers of Approximate Distinct Counts of Dataset Records," which is incorporated by reference herein in its entirety.

TECHNICAL FIELD

The disclosed implementations relate generally to data sketches for summarizing data and more specifically to systems and methods that generates approximate distinct counts based on data sketches for large datasets.

BACKGROUND

When analyzing massive data sets, even simple operations such as computing a sum or a mean are costly and time consuming. These simple operations are frequently performed by people investigating the data interactively, asking a series of questions about the data. In addition, automated systems must monitor or collect a multitude of statistics. Data sketching algorithms enable the information in these massive data sets to be efficiently processed, stored, and queried. Data sketches can be applied, for example, in real-time systems, both for ingesting massive data streams or for interactive analysis.

In order to achieve this efficiency, sketches are designed to only answer a specific class of questions, and there is typically some amount of error in the answers. In other words, a data sketch is a form of lossy compression on the original data. A person must choose what information to lose from the original data. A good sketch makes efficient use of the data so that the errors are minimized while having the flexibility to answer a broad range of questions of interest. Some sketches, such as Hyper-LogLog, are constrained to answer very specific questions with extremely little memory. On the other end of the spectrum, sampling-based methods, such as coordinated sampling, are able to answer many questions about the original data, but at the cost of far more space to achieve the same approximation error.

Many data analysis problems consist of a simple aggregation over some filtering and group by conditions, such as
  SELECT dimensions, sum(metric)
  FROM table
  WHERE filters
  GROUP BY dimensions Approximate distinct count sketches are applied in many database applications to enable arbitrarily large distinct counts to be computed in a single pass with a limited memory size. However, some database applications demands a huge number of counters (e.g., billions of counters), such as when aggregate statistics must be computed for a large number of subgroups. Even if each counter takes only a few kilobytes of space in the memory, the total amount of memory needed could be tremendous and run out of control. Because of this, distinct count aggregation statistics are important but costly for database applications.

Existing solutions to approximating distinct counts suffer severe deficiencies in performance depending on sketch parameters and data distribution when real data sets are involved and the number of distinct counters is large. There is no effective way to detect when the performance is poor, and there are limited error guarantees. This makes it difficult or impossible to build a database application in which the performance of approximating the distinct counts for large datasets is guaranteed and trustworthy. Therefore, an alternative solution is needed that is efficient and produces accurate results.

SUMMARY

This disclosure addresses a challenging situation in which a substantially large number (e.g., millions or more) of distinct count aggregations are computed in a substantially simultaneous manner. This situation arises in many applications, including networking, databases, and real-time business reporting. Existing approaches are inherently flawed and exhibit unwanted bias that can be arbitrarily large. A novel data sketching method is disclosed in this application to address this challenging situation. This novel technique has provable guarantees of accuracy (i.e., having tight, practical error estimates). In some implementations, this data sketching method combines a CountMin sketch and a HyperLogLog sketch, and applies a theoretical analysis using statistical estimation techniques. The data sketching method implements cardinality estimation for single multisets, and provides provably efficient estimators with confidence intervals that have exactly a correct asymptotic coverage.

More specifically, this disclosure provides a new data sketch with distinct count estimation for processing massive data sets. It is guaranteed that approximated counts converge to the truth and at an optimal rate, and tight confidence intervals are derived to deliver substantially a promised coverage. Performance of the data sketch degrades gracefully under poor settings of sketching parameters for the data sets, making it less critical to choose the sketching parameters, and the resulting data sketch becomes more robust. Counts may be merged across sketches and within a single set. This allows the functionality of the data sketch to be nearly equivalent to that of storing individual distinct counting sketches. Cardinality estimation is applicable to a single dataset with error estimation that does not require empirical bias correction, and error bounds are constrained over the entire range of cardinalities.

In accordance with some implementations, a method of estimates counts of distinct items from data sets. The method is performed at a computer system having one or more processors and memory. The memory stores one or more programs configured for execution by the one or more processors. The computer system allocates an m×n matrix B in the memory, wherein $m \geq 2$ and $n \geq 2$. The system also receives a data stream including a plurality of data items. Each data item has a plurality of data fields, including (1) a set of query fields that specify a query key and (2) a set of identifier fields that specify how to determine distinct data items in the data stream. For each data item received from the data stream, the system computes a respective row r for the respective data item by hashing data values of the identifier fields for the respective data item according to a first hash function $h_1$, where r is an integer and $1 \leq r \leq m$. The system also computes a respective column c for the respective data item by hashing a combination of (i) data values of the query fields for the respective data item and (ii) the respective row r, according to a second hash function $h_2$, where c is an integer and $1 \leq c \leq n$. The system computes a respective bin value v for the respective data item by hashing data values of the identifier fields for the respective data item according to a third hash function $h_3$ and updates the matrix B by setting B[r,c]=max(v, B[r,c]). The system subsequently receives a query key value for which an approximate distinct count is requested. In response to the request, the system computes a respective column $c(i)=h_2$ (query key value, i) for each row i in the matrix B. The system then estimates the count of data items from the data stream whose data values for the query fields match the query key according to the matrix entries $B[1, c_1], B[2, c_2], \ldots, B[m, c_m]$.

In some implementations, estimating the count of data items from the data stream includes determining a cardinality value for each of the matrix entries $B[1, c_1], B[2, c_2], \ldots, B[m, c_m]$ and determining an estimation error for the cardinality value based on a composite likelihood estimation method. In some implementations, the system determines the accuracy of the estimation error based on the cardinality value.

In some implementations, estimating the count of data items from the data stream includes determining a cardinality value for each of the matrix entries $B[1, c_1], B[2, c_2], \ldots, B[m, c_m]$ and determining an estimation error for the cardinality value based on a maximum likelihood estimation method.

In some implementations, allocating the matrix B in memory uses a predefined range of values for each of the matrix entries.

In some implementations, for each data item, the respective bin value is a random number generated using a random hash.

In some implementations, the set of query fields includes exactly one data field from the plurality of data fields. In some implementations, the set of query fields includes two or more of the plurality of data fields.

In some implementations, the set of identifier fields includes exactly one data field from the plurality of data fields. In some implementations, the set of identifier fields includes two or more of the plurality of data fields.

In some instances, a first data item from the data stream and a second data item from the data stream have distinct values for the identifier data fields and the query data fields, but the first and second data items have computed rows and columns that are the same.

In accordance with some implementations, a method computes data sketches for data sets. This data sketching method is performed by a computer system having one or more processors and memory storing one or more programs configured for execution by the one or more processors. The computer system receives a data stream including a plurality of data items each of which has a plurality of data fields. The plurality of data fields includes (1) a set of query fields that is used in a data query for retrieving information concerning the data stream and (2) one or more additional data fields that are distinct from the set of query fields. Each data item corresponds to a data row having the plurality of data fields. In some instances, the data sketching method runs in real-time as data rows of the data stream are received. In some instances of receiving streaming data, the plurality of data items is at least partially buffered.

A plurality of data bin sets is allocated based on data field values of the one or more additional data fields of the plurality of data items. For each data bin set of the plurality of data bin sets, a respective plurality of data item bins is allocated based on a combination of query field values for the set of query fields. Each data item bin corresponds to at least one unique combination of query field values for the set of query fields.

In response to receiving each of the plurality of data items, the computer system hashes the respective data item to a respective data bin set according to data field values of the one or more additional data fields of the respective data item. Specifically, the respective data item is hashed to a respective data item bin in the respective data bin set according to (1) query field values of the set of query fields of the respective data item and (2) the data field values of the one or more additional data fields of the respective data item, and associated with a respective bin value in the respective data item bin of the respective data bin set to which the respective data item is hashed. A count value is determined for each bin in the data bin sets based on the bin values corresponding to the plurality of data items.

In some implementations, a cardinality value is determined for each bin of the plurality of data bin sets associated with the plurality of data items, and an estimation error is further determined for the cardinality value based on a composite likelihood estimation method. Further, in some implementations, an accuracy of the estimation error is determined based on the cardinality value. For example, the accuracy of the estimation error increases with the cardinality value. Alternatively, in some implementations, a cardinality value is determined for each bin of the plurality of data bin sets associated with the plurality of data items, and an estimation error is determined for the cardinality value based on a maximum likelihood estimation method.

In some implementations, for each of the plurality of data items, the respective bin value in the respective data item bin of the respective data bin set is within a predefined bin value range. Further, in some implementations, for each data item, the respective bin value is a random number generated using a random hash (e.g., not using a seed value).

In some implementations, the plurality of data bin sets includes a first data bin set associated with first data field values of the one or more additional data fields, and each bin in the first data bin set is configured to occupy a respective portion of memory that does not exceed a predetermined amount of memory space allocated to the respective bin in the first data bin set. In some implementations, the plurality of data bin sets includes a first data bin set associated with first data field values of the one or more additional data fields, and the first data bin set occupies a total memory space that does not exceed a predetermined total amount of memory space.

In some implementations, the plurality of data bin sets includes a first data bin set having a first number of data item bins, and the first number does not exceed a predetermined bin number associated with the first data bin set.

In some implementations, the plurality of data bin sets includes a first data bin set allocated to first data field values of the one or more additional data fields and a second data bin set allocated to second data field values of the one or more additional data fields. A first data item has the first data field values in the one or more additional data fields, and a second data item has the second data field values in the one or more additional data fields. Both the first and second data items have a combination of query field values in the set of query fields. The first data item is hashed to a first data item bin corresponding to a first column in the first data bin set, and the second data item is hashed to a second data item bin corresponding to a second column in the second data bin set. The first and second column are distinct from each other in the first and second data bin sets.

In some implementations, the plurality of data bin sets includes a first data bin set allocated to first data field values of the one or more additional data fields. A first data item has a first combination of query field values in the set of query fields. A second data item has a second combination of query field values of the set of query fields, the second combination being distinct from the first combination. Both the first and second data items are hashed to a first data item bin in the first data bin set with two distinct bin values.

In some implementations, the one or more additional data fields include an identification field that identifies an object associated with each of the plurality of data items, and are not used in the data query for retrieving the information concerning the data stream. Examples of the identification field include, but are not limited to, a person's name, an IP address of a user, or a user account name.

In some implementations, a computer system includes one or more processors and memory. The memory stores one or more programs. The programs are configured for execution by the one or more processors. The one or more programs include instructions for performing any of the methods described herein.

In some implementations, a non-transitory computer readable storage medium stores one or more programs configured for execution by a computer system having one or more processors and memory. The one or more programs include instructions for performing any of the methods described herein.

Thus methods, systems, and graphical user interfaces are disclosed for building data sketches that enable a user quickly get answers about a large data set.

BRIEF DESCRIPTION OF THE DRAWINGS

For a better understanding of the aforementioned systems and methods, as well as additional systems methods for implementing data sketches, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
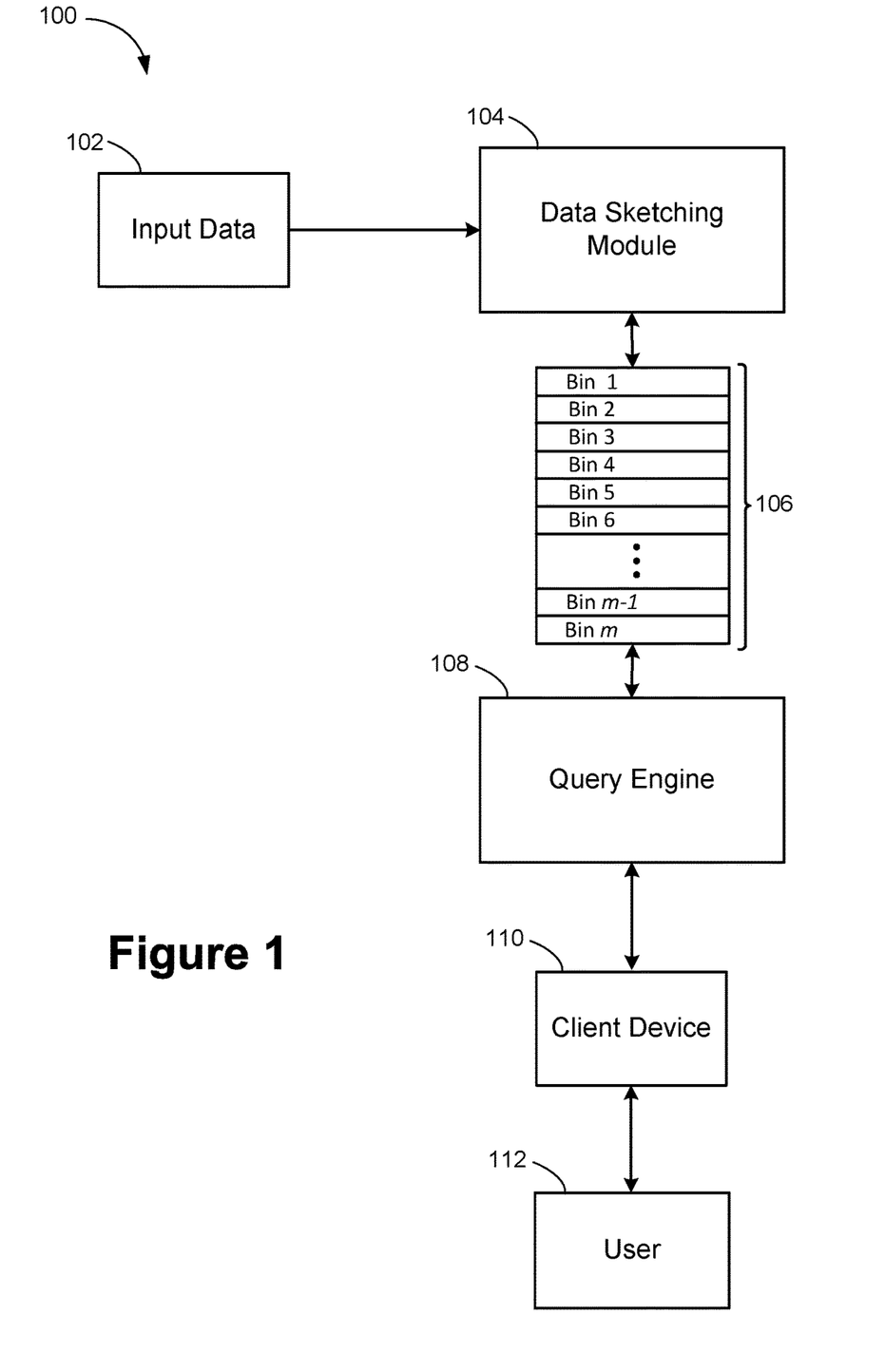
FIG. 1 illustrates schematically the general context in which a data sketch is constructed and used in accordance with some implementations.

FIG. 1 illustrates schematically a general context 100 in which a data sketch is constructed and used, in accordance with some implementations. A data sketching module 104 receives input data 102, which may be a data stream or retrieved from a stored data source. In some implementations, data items from the input data are placed into a data buffer as rows of data are received or retrieved. In some instances, the data sketching module 104 manages a fixed collection 106 of m bins, where m is a positive integer. In some implementations, m is generally in the range of 100,000 to 1,000,000. The number m of bins is determined at the outset before processing rows from the input data 102, and the number of bins remains fixed during the processing. This application is directed to a distinct count sketch including a plurality of sub-sketches. The fixed collection 106 of m bins includes a plurality of data bin sets (e.g., k data bin sets) each of which corresponds to a sub-sketch and has a plurality of data item bins. In general, the total number of bins of the plurality of data bin sets is equal to m, which is significantly less than the number of rows in the input data. For example, 10 million rows of data and 100,000 bins. In some implementations, each bin corresponds to at least one query key and the data in the bin encodes an estimate of a count (or magnitude), as explained in more detail below in FIG. 4.

Using the data in the bins 106, a query engine 108 is able to answer specific types of questions (i.e., queries) about the data. In some instances, queries against the bins 106 are not processed until all of the data is processed (e.g., the input stream 102 is closed). In other instances, queries are allowed against the bins while the data sketching module 104 is still processing rows from the input data 102.

The query engine receives a query from a client device 110, which may be entered by a user 112. In some instances, a query is generated at the client device by an automated process (e.g., generated by a data analysis application 222 according to user specification of data visualization characteristics).

Figure 2:
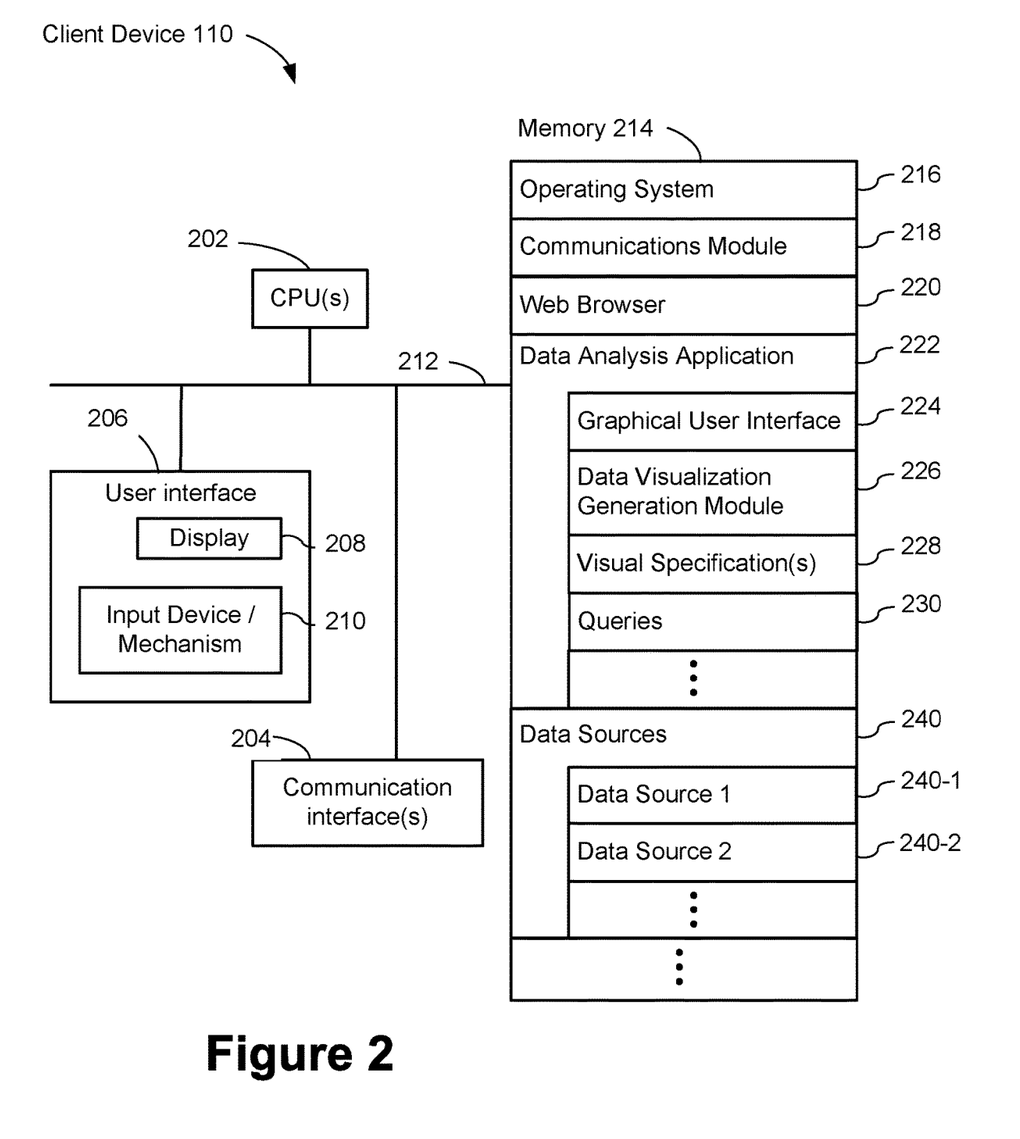
FIG. 2 is a block diagram of a client device according to some implementations.

FIG. 2 is a block diagram illustrating a client device 110 in accordance with some implementations. A client device may also be referred to as a computing device or a personal device. Various examples of a client device 110 include a desktop computer, a laptop computer, a tablet computer, a smart phone, and other computing devices that have a processor capable of running user applications (e.g., a data analysis application 222). The client device 110 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The client device 110 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 110 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data analysis application 222, which provides a graphical user interface 224 for a user to construct visual graphics. For example, a user selects one or more data sources 240 (which may be stored on the client device 110 or stored remotely), selects data fields from the data source(s), and uses the selected fields to define a visual graphic. In some implementations, the information the user provides is stored as a visual specification 228. The data analysis application 222 includes a data visualization generation module 226, which takes the user input (e.g., the visual specification 228), and generates a corresponding visual graphic (also referred to as a "data visualization" or a "data viz"). The data analysis application 222 then displays the generated visual graphic in the user interface 224. In some implementations, the data analysis application 222 executes as a standalone application (e.g., a desktop application). In some implementations, the data analysis application 222 executes within the web browser 220 or another application using web pages provided by a web server. In some implementations, the data analysis application 222 sends one or more queries 230 to an external computer system 300 to retrieve data. In some instances, data is retrieved from one or more data sources 240 by a database engine 340 running on the computer system 300. In some instances, data is retrieved from the data bins 106 that were populated by a data sketch;
- zero or more data sources 240 (e.g., a first data source 240-1 and a second data source 240-2), which are used by the data analysis application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
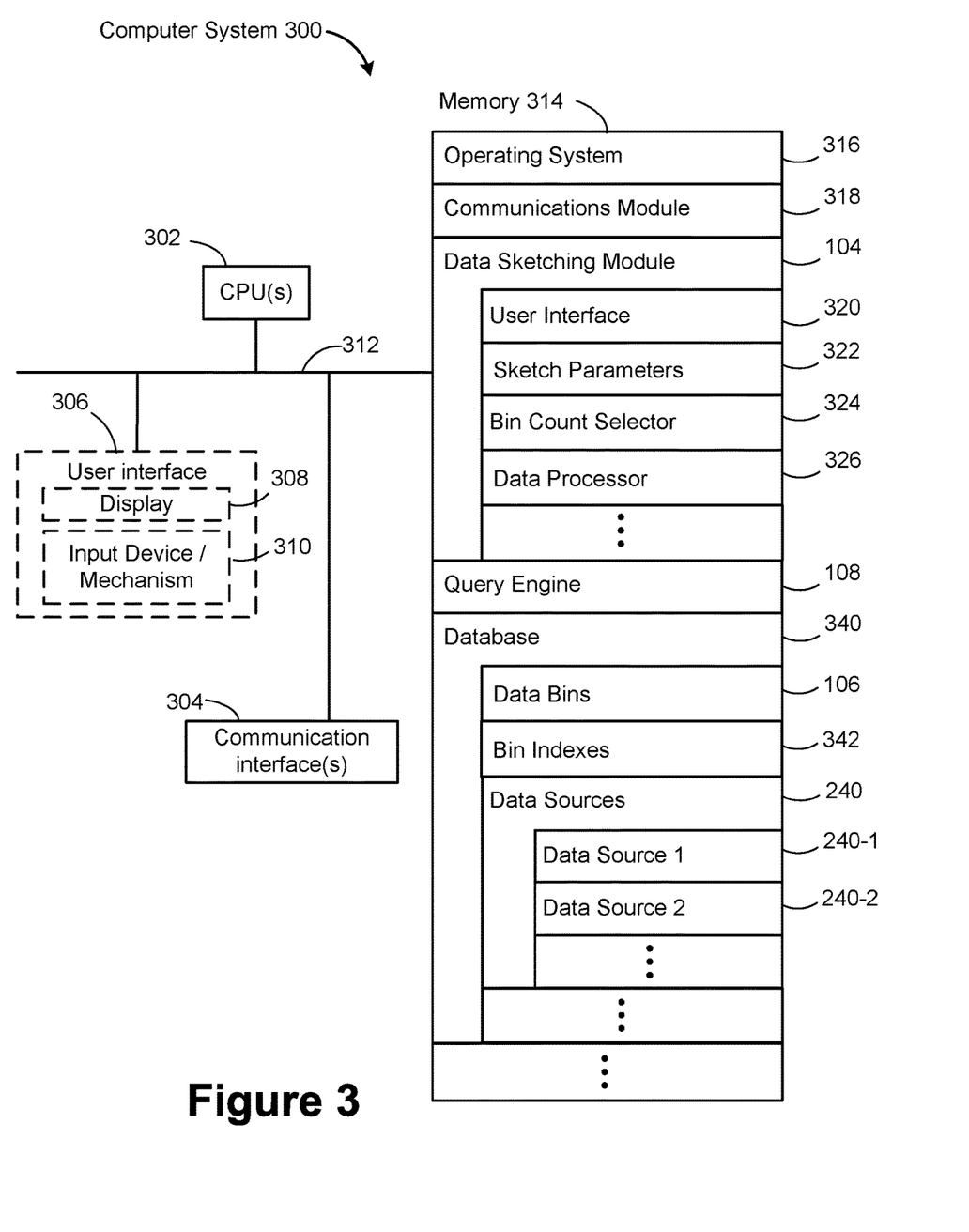
FIG. 3 is a block diagram of a computer system according to some implementations.

FIG. 3 is a block diagram of a computer system 300 in accordance with some implementations. A computer system 300 includes one or more individual computers. The computer system 300 may host one or more databases 340 and/or may provide various executable applications or modules. A computer system 300 typically includes one or more processing units/cores (CPUs) 302, one or more network interfaces 304, memory 314, and one or more communication buses 312 for interconnecting these components. In some implementations, the computer system 300 includes a user interface 306, which includes a display device 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprises a non-transitory computer readable storage medium.

In some implementations, the memory 314 or the computer readable storage medium of the memory 314 stores the following programs, modules, and data structures, or a subset thereof:

- an operating system 316, which includes procedures for handling various basic system services and for performing hardware dependent tasks;
- a network communication module 318, which is used for connecting the computer system 300 to other computers via the one or more communication network interfaces 304 (wired or wireless) and one or more communication networks, such as the Internet, other wide area networks, local area networks, metropolitan area networks, and so on;
- a web server (such as an HTTP server), which receives web requests from users and responds by providing responsive web pages or other resources;
- a data analysis web application, which may be downloaded and executed by a web browser 220 on a user's computing device 110. In general, a data analysis web application has the same functionality as a desktop data analysis application 222, but provides the flexibility of access from any device at any location with network connectivity, and does not require installation and maintenance. In some implementations, the data analysis web application includes various software modules to perform certain tasks, including a user interface module, a data retrieval module, a data visualization generation module 226, a relationship identification module, and a relationship builder module. In some implementations, the data analysis web application uses a visual specification 228, as described above with respect to FIG. 2;

a data sketching module 104, which receives rows of data from input data 102 (e.g., a streaming source or a stored data source 240) and builds a data sketch. Each row of data corresponds to a data item in the input data 102. The data for the data sketch is stored in an array of bins 106 (e.g., including a plurality of data bin sets each having multiple bins). In some implementations, the data sketching module includes a user interface 320, which enables users to specify sketch parameters 322 for a data sketch (e.g., the data source, which fields will be used to build the bin keys for retrieving information of each data item in the input data, and whether the sketch is computing counts or sums of a specific numeric data field). In some implementations, the user-specified sketch parameters includes one of more of the total number of bins, the number of data bin sets, and the number of bins in each set. In other implementations, a bin count selector 324 determines the number of bins based on known data about the data source and/or other user-specified sketch parameters (e.g., the maximum allowable error for the data sketch). The data sketching module 104 includes a data processor 326, which processes individual rows of data from the input data 102 to update the data in the bins 106;

a query engine 108, which receives queries 230, and generates responsive results from the data bins 106. The queries 230 are limited to specific types of questions based on the stored data sketch (e.g., distinct counts, subset sums, or frequent items according to the data fields selected for the sketch). For example, to respond to a subset sum query 230, the query engine identifies which bins match the selection criteria, and then sums the counts of the matching bins; and one or more databases 340, which store data that may be used by a data analysis application 222, used by a data analysis web application, and/or used by the query engine 108 to answer specific questions using data in the bins 106 of a data sketch. Note that a single database may store bins 106 for a plurality of distinct data sketches. When there are multiple data sketches, they may be based on the same input data 102, or based on distinct input data sets. Typically, there are one or more bin indexes 342 for the data bins 106. For example, for efficiency of matching a new row to existing bins, there is a first bin index 342 based on selected key fields (also called query fields). In this way, finding the matching bin (if there is one) is performed by a quick lookup (which is $O(\log(m))$ rather than $O(m)$). In some implementations, an index is based on the hash values of key values (also called query field values of the query fields). Some implementations also maintain an index on the count for each bin, which enables quick lookup of the bin with the smallest count. In some implementations, looking up the bin with the lowest count handles both the case where there is an empty bin (count=0) as well as the case where the lowest count is non-zero.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a computer system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a computer system 300 may be stored on a client device 110. In some implementations, the functionality and/or data may be allocated between a client device 110 and a computing system 300. FIG. 3 need not represent a single physical device. In some implementations, the functionality of the computer system 300 is allocated across multiple physical devices. As used herein, references to a "computer system" include various groups, collections, or arrays of individual computing devices, which collectively provide the described functionality, and the physical servers need not be physically collocated (e.g., the individual physical devices could be spread throughout the United States or throughout the world).

In accordance with some implementations of this application, each of the created m bins has an "item" and a "count." In some instances, an "item" is also referred to as a "key value," which is a combination of query field values of query fields of the input data, and the "count" is also referred to as a "counter value" or a "count value." In general, multiple rows from the input data 102 will be aggregated into the same bin. If there are N total rows in the input data 102, then on average each bin will end up with a counter value of N/m. Note that the count associated with a bin may not be stored directly. Some implementations encode the count in an alternative way (e.g., for sketches that are used to estimate distinct counts).

In some implementations, as each row is processed (e.g., from a stream), the key value for the new row is matched to an existing bin if possible (e.g., using an index on the key value). When there is a match, a bin value is optionally assigned to represent the data item in the existing bin and used to determine the counter value subsequently. Alternatively, when there is match, the counter value is updated (e.g., using max(current value, new value) or incrementing).

Figure 4:
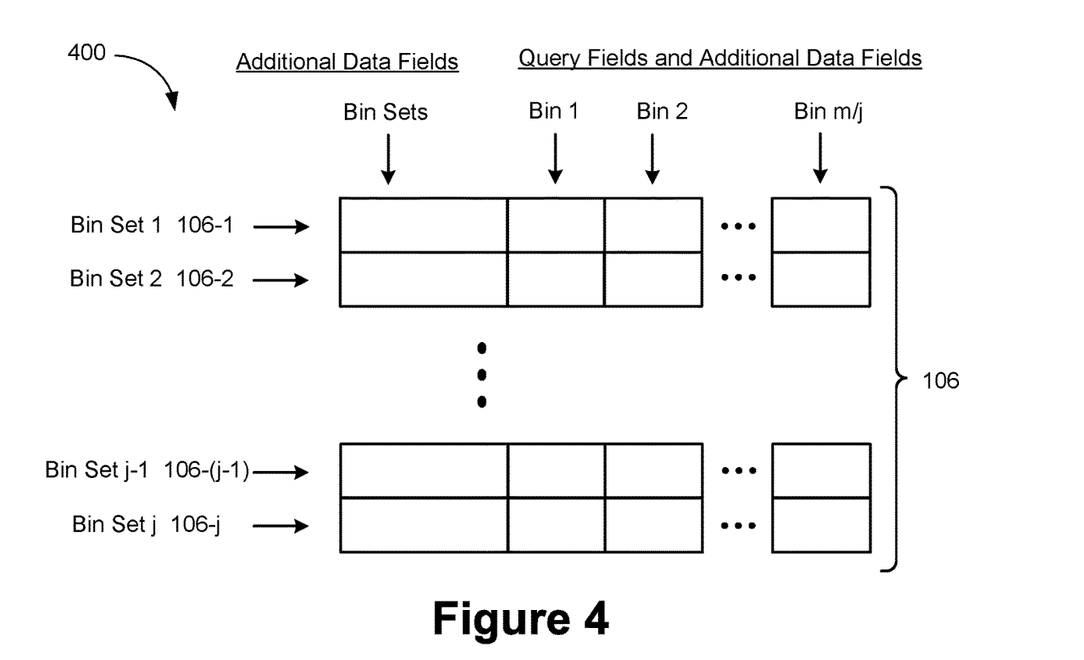
FIG. 4 illustrates a bin structure used by a distinct count sketch in accordance with some implementations.

FIG. 4 illustrates a bin structure 400 used by a distinct count sketch in accordance with some implementations. The bins 106 consist of m distinct bins, bin 1 106-1 through bin m 106-$m$. The bins 106 are organized in a plurality of data bin sets including bin set 1, bin set 2, . . . , bin set j. In some implementations, each data bin set has the same number of bins (i.e., m/j bins). In some implementations, each bin has a key value and a counter value. Implementations store the key values in various ways, such as a string that concatenates the values for each of the selected data fields. In some implementations, the key values are values of data fields (e.g., l-tuples of the individual field values). In some implementations (not shown), each bin stores a hash value, which is a hash of data values.

Input data includes a plurality of data items, and each data item has a plurality of data fields. In some instances, the input data is a data stream that is processed in real time while the data stream is received. In some implementations, the plurality of data fields includes (1) a set of query fields that is used in a data query for retrieving information concerning the data stream (e.g., a subset of the plurality of data items) and (2) one or more additional data fields that are distinct from the set of query fields (e.g., one or more of which are used to identify which data items are considered distinct). Query field values in the query fields are used in questions asked by a user to retrieve the information concerning the data stream. In contrast, data in the one or more additional data fields are not used for retrieving information concerning the data stream. For example, the one or more additional data fields include an identification field (or a plurality of fields) that identifies an object associated with each of the plurality of data items, and are not used in the data query for retrieving the information concerning the data stream. Examples of the identification field include, but are not limited to, a person's name, an IP address of a user, or a user account name.

In some implementations, when the data stream is received and processed, the data bin sets are allocated based on data field values of the one or more additional data fields, and the bins in each bin set are allocated based on the query field values of the query fields. In other implementations, the number of data bin sets and/or the number of bins in each data bin set are determined independently.

In some implementations, the plurality of data bin sets includes a first data bin set (Bin Set 1) 106-1 associated with first data field values of the one or more additional data fields, and the memory associated with the first data bin set is controlled. Each bin in the first data bin set is configured to occupy a respective portion of memory that does not exceed a predetermined amount of memory space allocated for the respective first data bin set. Alternatively, in some implementations, the first data bin set occupies a total memory space that does not exceed a predetermined total amount of memory space. Further, in some implementations, the first data bin set (Bin Set 1) has a first number of data item bins, and the first number does not exceed a predetermined bin number associated with the first data bin set. It is noted that in some implementations, the memory size or the number of bins for all of the data bin sets are controlled as disclosed above.

Figure 5:
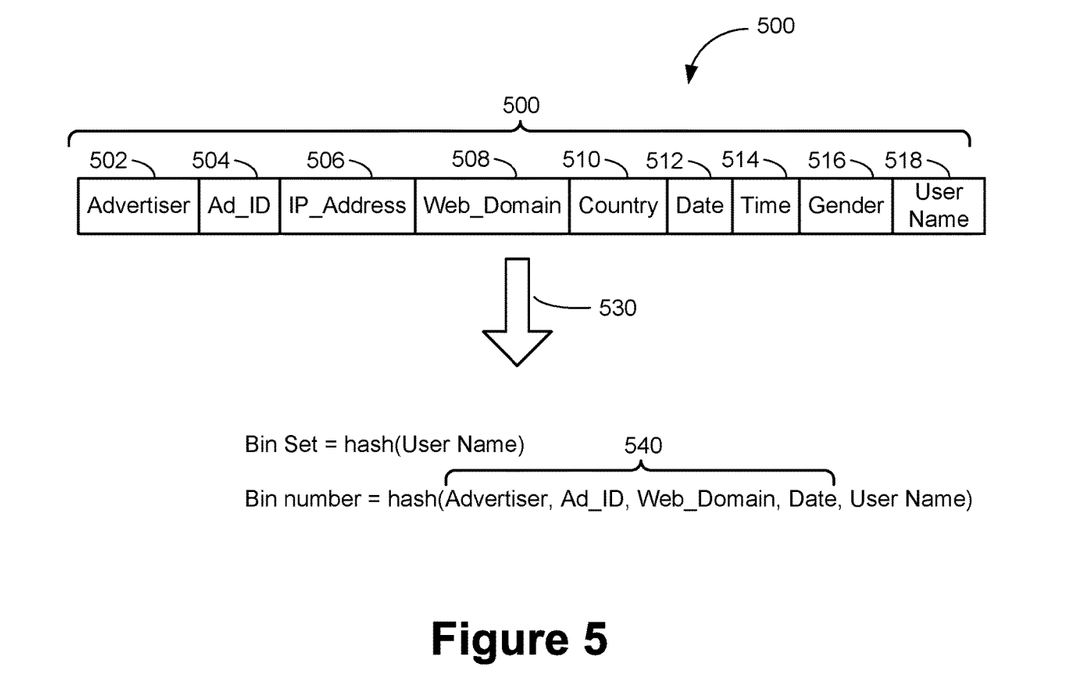
FIG. 5 illustrates available data fields in a data source and selection of a subset of these fields to be used as query fields used by the distinct count sketch shown in FIG. 4 in accordance with some implementations.

FIG. 5 illustrates available data fields 500 in a data source and selection of a subset of these fields to be used as query fields used by the distinct count sketch shown in FIG. 4 in accordance with some implementations. This data source represents click-through data for online advertising. In this case, the data fields 500 include an Advertiser 502 (e.g., an advertiser code), a unique Ad_ID 504, an IP_Address 506 indicating the IP address of the client device 110 where the click event occurred, and the Web_Domain 508 of the website where the advertisement was clicked. The data source also includes a Country 510, which specifies the country where the click-through event occurred, as well as Date and Time fields 512 and 514, which specify when each click-through event occurred. In some implementations, certain demographic or personal information about the user is also known (or inferred). For example, the Gender 516 and User Name 518 may be filled in for rows from this data source.

In some implementations, the data sketching module provides a user interface 320, which enables the user to select (530) which of the data fields will be designated as query fields 540. In some implementations, the selected fields 540 are stored as sketch parameters 322. In this example, the query fields 540 include Advertiser 502, Ad_ID 504, Web_Domain 508, and Date 512, which are used in queries to retrieve information in the data stream. Additional data fields (e.g., the User Name 518) determine which bin set a certain data item is hashed to (e.g., the User Name 518 is the identifier data field). The query fields and the additional data fields are used jointly to hash the data item into a specific bin with a bin value. In some implementations, data items having different combinations of values in the query fields and additional data fields are hashed to the same bin but with distinct bin values. As a large number of data items are hashed into a bin with their respective bin values, a count value is generated based on the bin values.

In some implementations, the bin values assigned to the data items are within a predefined bin value range. For example, for each data item, the respective bin value is a random number generated using a seed determined based on the query field values of the set of query fields and the data field values of the additional data fields. For each bin, the count value is estimated based on a maximum value or a minimum value of the bin values of the data items hashed into the respective bin.

In some instances, while and after the data items are hashed into different data item bins in the different data bin sets, a cardinality value is determined for each bin of the plurality of data bin sets. An estimation error for the cardinality value is determined based on a composite likelihood estimation method. It is noted that an accuracy of the estimation error is associated with the cardinality value. For example, the estimation error associated with the composite likelihood estimation method increases as the cardinality value increases. Alternatively, in some instances, the estimation error for the cardinality value is determined based on a maximum likelihood estimation method, which can be less accurate than the composite likelihood estimation method in some situations.

Figure 6:
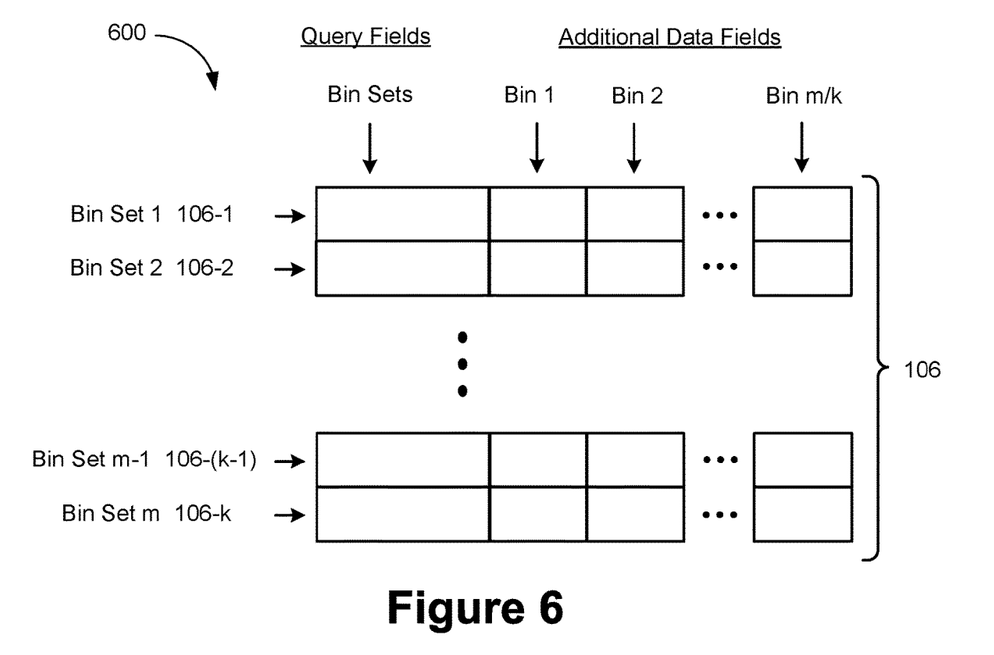
FIG. 6 illustrates another example structure of bin sets and bins used by a distinct count sketch in accordance with some implementations.

FIG. 6 illustrates another example structure of bin sets and bins 600 used by a distinct count sketch in accordance with some implementations. The bins 106 consist of m distinct bins, bin 1 106-1 through bin m 106-m. The bins 106 are organized into a plurality of data bin sets including bin set 1 106-1, bin set 2 106-2, . . . , bin set k 106-k. When the data stream is received and processed, the data bin sets are conveniently allocated based on the query field values of the query fields. For each bin set, data field values of the one or more additional data fields are used to allocate a plurality of data item bins.

Figure 7:
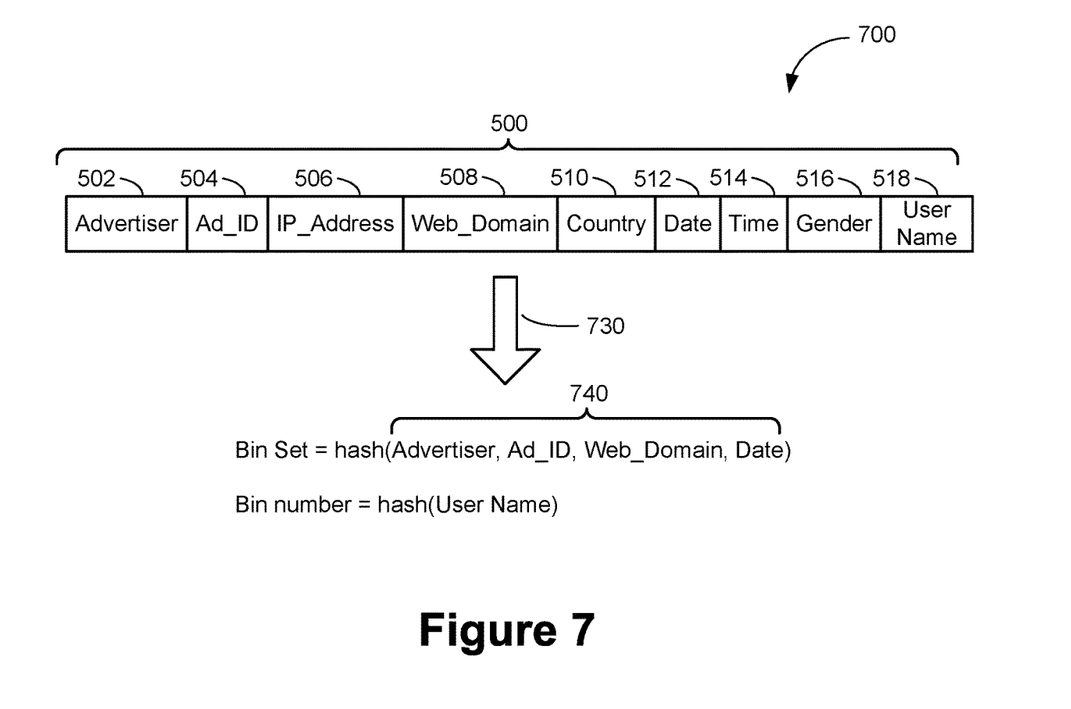
FIG. 7 illustrates available data fields in a data source and selection of a subset of these fields to be used as the key fields used by the distinct count sketch shown in FIG. 6 in accordance with some implementations.

FIG. 7 illustrates available data fields 700 in a data source and selection of a subset of these fields to be used as the key fields used by the distinct count sketch shown in FIG. 6 in accordance with some implementations. The query fields 740 include Advertiser 502, Ad_ID 504, Web_Domain 508 and Date 512, which are used in queries to retrieve information in the data stream. These query fields 740 determine (730) which bin set a certain data item is hashed to. The User Name 518 is (730) an additional field used to hash the data item into a specific bin. In some implementations, different values in User Name 518 (i.e., corresponding to different users) are hashed to the same bin but with distinct bin values.

As a large number of data items are hashed into a bin with their respective bin values, a count value is generated based on the bin values.

Figure 8:
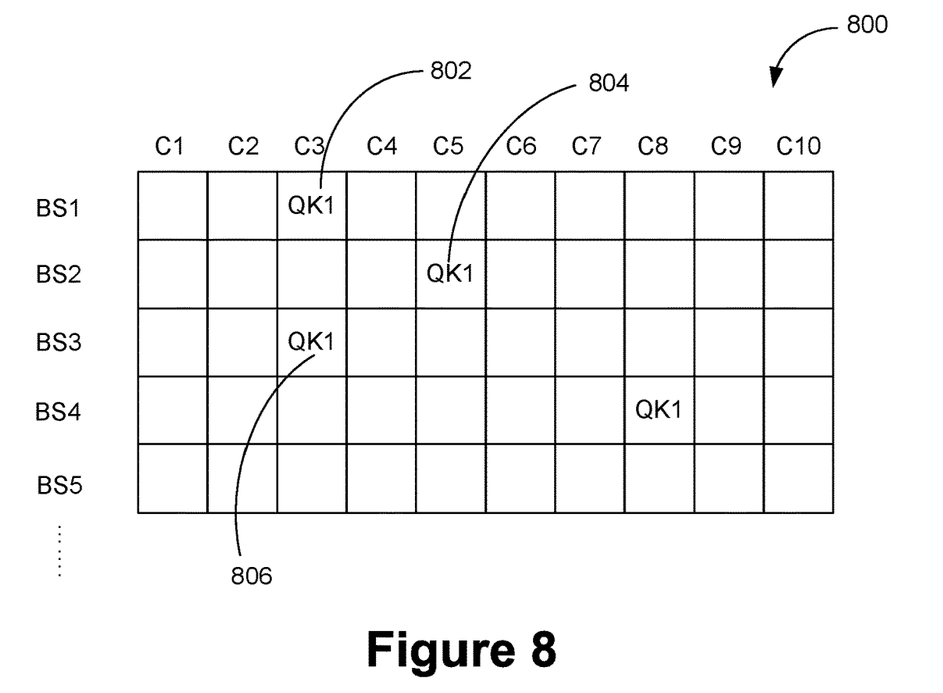
FIGS. 8 and 9 illustrate example distributions of data items associated with predetermined query keys (i.e., having predetermined query field values of query fields) in accordance with some implementations.
Figure 9:
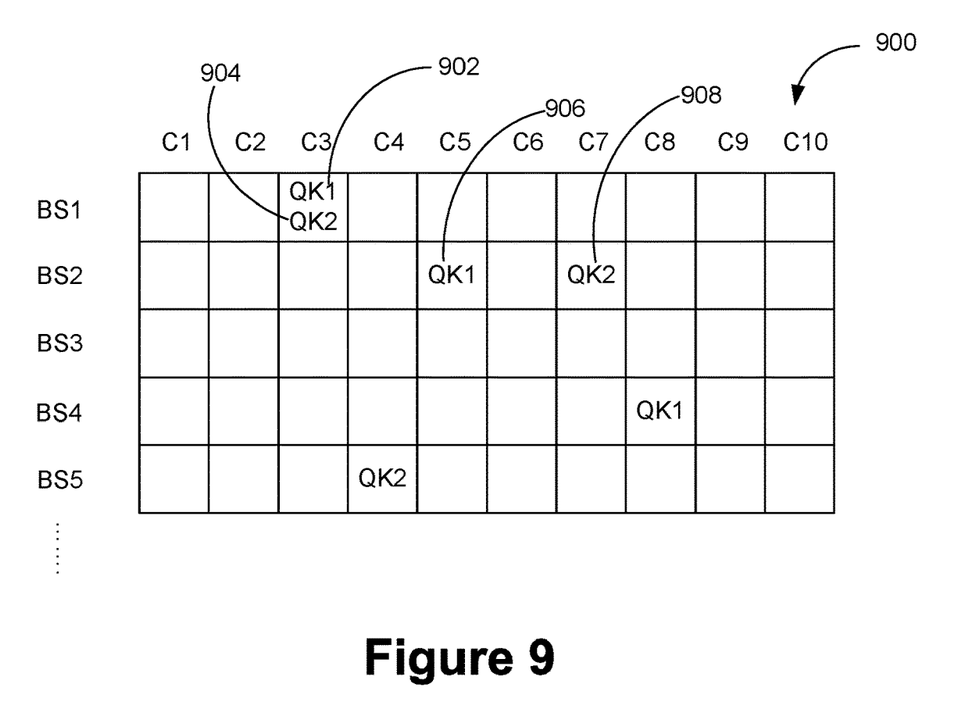

FIGS. 8 and 9 illustrate example distributions 800 and 900 of data items associated with predetermined query keys QK1 and QK2 (i.e., having predetermined query field values of query fields) in accordance with some implementations, respectively. Query key QK1 is associated with a first key value representing a first combination of query field values in the set of query fields used to retrieve information concerning data items in a data stream. The plurality of data bin sets BS1, BS2, BS3, BS4, and BS5 includes a first data bin set B Si allocated to first data field values of one or more additional data fields and a second data bin set BS2 allocated to second data field values of the one or more additional data fields. The one or more additional data fields are not used to query the data stream (i.e., not used in questions of a user to extract information of the data items in the data stream). A first data item 802 has the first data field values in the one or more additional data fields, and is allocated to the first data bin set BS 1. A second data item 804 has the second data field values in the one or more additional data fields, and is allocated to the second data bin set BS2.

Both the first and second data items 802 and 804 have a combination of query field values in the set of query fields. In some implementations, a data item is hashed to a data item bin in a corresponding data bin set according to both (1) the query field values of the set of query fields of the data item (i.e., represented by the key value) and (2) the data field values of the one or more additional data fields of the data item. For example, even though both the first and second data items 802 and 804 have the same combination of query field values QK1, they are assigned to bins at different locations. That is, a first data item bin corresponding to a first column (e.g., column C3 in BS1) in the first data bin set BS1 and a second data item bin corresponding to a second column (e.g., column C5 in BS2) in the second data bin set BS2. The first and second column are distinct from each other in the first and second data bin sets BS1 and BS2.

In contrast, in some instances, a hash function is associated with many-to-one mapping, and different data field values are hashed to the same column in data bin sets although their corresponding key values are not equal. For example, a third data item 806 has the third data field values in the one or more additional data fields, and is allocated to the third data bin BS3. Both the first and third data items 802 and 806 have the same combination of query field values QK1, and assigned to the same column (i.e., column C3 in BS1 and BS3) in the first and third data bin sets BS1 and BS3.

Referring to FIG. 9, in some implementations, the plurality of data bin sets includes the first data bin set BS1 allocated to first data field values of the one or more additional data fields. A first data item 902 has a first combination of query field values QK1 in the set of query fields. A second data item 904 has a second combination of query field values QK2 of the set of query fields. The second combination QK2 is distinct from the first combination QK1. In some implementations, both the first and second data items are hashed to a first data item bin in the first data bin set (e.g., the bin in column C3 of BS1), but are associated with two distinct bin values (i.e., the corresponding values of the identifier field are different).

Alternatively, in some instances, the plurality of data bin sets includes the second data bin set BS2 allocated to second data field values of the one or more additional data fields. A third data item 906 has the first combination of query field values QK1 in the set of query fields. A fourth data item 908 has the second combination of query field values QK2 of the set of query fields. The second combination QK2 is distinct from the first combination QK1. In some instances, the third and fourth data items 906 and 908 are hashed to two distinct bins in the second data bin set (e.g., the bins in columns C5 and C7 of BS2).

Figure 10:
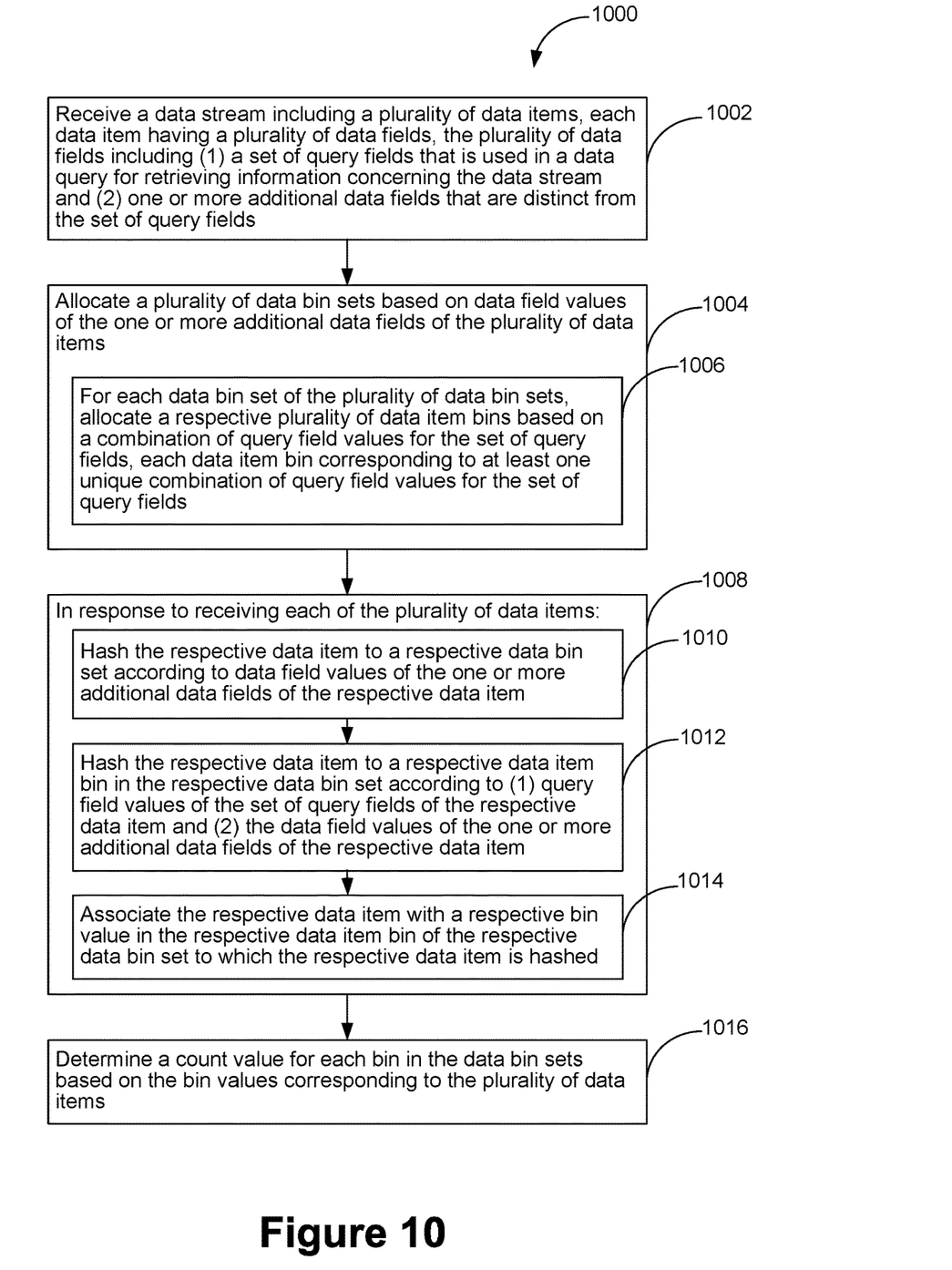
FIG. 10 provides a flowchart of a process for building and using a data sketch according to some implementations.

FIG. 10 illustrates a flow chart of a method 1000 of building a data sketch in accordance with some implementations. This example uses the data illustrated in FIGS. 4 and 5, including rows of data with the data fields 502-518, and computing a count value for each bin in the data bin sets shown in FIG. 4. This method 1000 is performed by a computer system 300 having one or more processors 302 and memory 314 storing one or more programs configured for execution by the one or more processors 302. The computer system 300 receives (1002) a data stream including a plurality of data items each of which has a plurality of data fields. The plurality of data fields includes (1) a set of query fields that is used in a data query for retrieving information concerning the data stream and (2) one or more additional data fields that are distinct from the set of query fields. Each data item corresponds to a data row having the plurality of data fields. In some instances, the data sketching method runs in real-time as data rows if the data stream are received. In some instances of receiving streaming data, the plurality of data items is at least partially buffered.

A plurality of data bin sets is allocated (1004) based on data field values of the one or more additional data fields of the plurality of data items. For each data bin set of the plurality of data bin sets, a respective plurality of data item bins is allocated (1006) based on a combination of query field values for the set of query fields. Each data item bin corresponds to at least one unique combination of query field values for the set of query fields.

In response to receiving each of the plurality of data items (1008), the computer system hashes (1010) the respective data item to a respective data bin set according to data field values of the one or more additional data fields of the respective data item. Specifically, the respective data item is hashed (1012) to a respective data item bin in the respective data bin set according to (1) query field values of the set of query fields of the respective data item and (2) the data field values of the one or more additional data fields of the respective data item, and associated (1014) with a respective bin value in the respective data item bin of the respective data bin set to which the respective data item is hashed. A count value is determined (1016) for each bin in the data bin sets based on the bin values corresponding to the plurality of data items.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of estimating counts of distinct items from data sets, comprising:
   at a computer system having one or more processors and g memory storing one or more programs configured for execution by the one or more processors:
     allocating an m×n matrix B in the memory, wherein m≥2 and n≥2;
     receiving a data stream including a plurality of data items, each data item having a plurality of data fields, the data fields including (1) a set of query fields that specify a query key and (2) a set of identifier fields that specify how to determine distinct data items in the data stream;
     for each data item received from the data stream:
       computing a respective row r for the respective data item by hashing data values of the identifier fields for the respective data item according to a first hash function $h_1$, wherein r is an integer and 1≤r≤m;
       computing a respective column c for the respective data item by hashing a combination of (i) data values of the set of query fields for the respective data item and (ii) the respective row r, according to a second hash function $h_2$, different from $h_1$, wherein c is an integer and 1≤c≤n;
       computing a respective bin value v for the respective data item by hashing data values of the identifier fields for the respective data item according to a third hash function $h_3$, different from $h_2$ and $h_1$, wherein the respective bin value indicates a respective data bin storinq the respective data item; and
       updating the matrix B by computing B[r,c]=max (v, (B[r,c]);
     receiving, from a client device, a request for an approximate distinct count of a query key value;
     for each row i in the matrix B, computing a respective column c(i)=$h_2$ (query key value, i) in response to the request;
     estimating a count of data items from the data stream whose data values for the set of query fields match the query key value according to the matrix entries B[1, $c_1$], B[2, $c_2$], . . . , B[m, $c_m$] based at least on the respective computed column c(i) of each row i; and
     returning the estimated count of data items to the client device.

2. The method of claim 1, wherein the estimating of the count of data items from the data stream comprises:
   determining a cardinality value for each of the matrix entries B[1, $c_1$], B[2, $c_2$], . . . , B[m, $c_m$]; and
   determining an estimation error for the cardinality value based on a composite likelihood estimation method.

3. The method of claim 2, comprising:
   determining an accuracy of the estimation error based on the cardinality value.

4. The method of claim 1, wherein the estimating of the count of data items from the data stream comprises:
   determining a cardinality value for each of the matrix entries B[1, $c_1$], B[2, $c_2$], . . . , B[m, $c_m$]; and
   determining an estimation error for the cardinality value based on a maximum likelihood estimation method.

5. The method of claim 1, wherein the allocating of the matrix Bin the memory uses a predefined range of values for each of the matrix entries B[1, $c_1$], B[2, $c_2$], . . . , B[m, $c_m$].

6. The method of claim 5, wherein for each data item, the respective bin value is a random number generated using a random hash.

7. The method of claim 1, wherein the set of query fields includes exactly one data field from the plurality of data fields.

8. The method of claim 1, wherein the set of query fields includes two or more of the plurality of data fields.

9. The method of claim 1, wherein the set of identifier fields includes exactly one data field from the plurality of data fields.

10. The method of claim 1, wherein the set of identifier fields includes two or more of the plurality of data fields.

11. The method of claim 1, wherein a first data item from the data stream and a second data item from the data stream have distinct values for the set of identifier fields and the set of query fields, but the first and second data items have computed rows and columns that are the same.

12. A computer system having one or more computing devices, each computing device having one or more processors and memory, wherein the memory stores one or more programs configured for execution by the one or more processors, and the one or more programs comprise instructions for:
    allocating an m×n matrix Bin the memory, wherein m≥2 and n≥2;
    receiving a data stream including a plurality of data items, each data item having a plurality of data fields, the data fields including (1) a set of query fields that specify a query key and (2) a set of identifier fields that specify how to determine distinct data items in the data stream;
    for each data item received from the data stream:
      computing a respective row r for the respective data item by hashing data values of the identifier fields for the respective data item according to a first hash function $h_1$, wherein r is an integer and 1≤r≤m;
      computing a respective column c for the respective data item by hashing a combination of (i) data values of the set of query fields for the respective data item and (ii) the respective row r, according to a second hash function $h_2$, different from $h_1$, wherein c is an integer and 1≤c≤n;
      computing a respective bin value v for the respective data item by hashing data values of the identifier fields for the respective data item according to a third hash function $h_3$, different from $h_2$ and $h_1$, wherein the respective bin value indicates a respective data bin storing the respective data item; and
      updating the matrix B by computing B[r,c]=max (v,(B[r,c]);
    receiving, from a client device, a request for an approximate distinct count of a query key value;
    for each row i in the matrix B, computing a respective column c(i)=$h_2$ (query key value, i) in response to the request;
    estimating a count of data items from the data stream whose data values for the set of query fields match the query key value according to the matrix entries B[1, $c_1$], B[2, $c_2$], ..., B[m, $c_m$] based at least on the respective computed column c(i) of each row i; and returning the estimated count of data items to the client device.

13. The computer system of claim 12, wherein the estimating gf the count of data items from the data stream comprises:

determining a cardinality value for each of the matrix entries B[1, $c_1$], B[2, $c_2$], ..., B[m, $c_m$]; and determining an estimation error for the cardinality value based on a composite likelihood estimation method.

14. The computer system of claim 12, wherein the estimating gf the count of data items from the data stream comprises:

determining a cardinality value for each of the matrix entries B[1, $c_1$], B[2, $c_2$], ..., B[m, $c_m$]; and determining an estimation error for the cardinality value based on a maximum likelihood estimation method.

15. The computer system of claim 12, wherein for each data item, the respective bin value is a random number generated using a random hash.

16. The computer system of claim 12, wherein the set of query fields includes exactly one data field from the plurality of data fields.

17. The computer system of claim 12, wherein the set of query fields includes two or more of the plurality of data fields.

18. The computer system of claim 12, wherein the set of identifier fields includes exactly one data field from the plurality of data fields.

19. The computer system of claim 12, wherein the set of identifier fields includes two or more of the plurality of data fields.

20. A non-transitory computer readable storage medium storing one or more programs configured for execution by a computing device having one or more processors and a memory, the one or more programs comprising instructions for:

allocating an m×n matrix B in the memory, wherein m≥2 and n≥2;

receiving a data stream including a plurality of data items, each data item having a plurality of data fields, the data fields including (1) a set of query fields that specify a query key and (2) a set of identifier fields that specify how to determine distinct data items in the data stream;

for each data item received from the data stream:

computing a respective row r for the respective data item by hashing data values of the identifier fields for the respective data item according to a first hash function $h_1$, wherein r is an integer and 1≤r≤m;

computing a respective column c for the respective data item by hashing a combination of (i) data values of the set of query fields for the respective data item and (ii) the respective row r, according to a second hash function ha different from $h_1$, wherein c is an integer and 1≤c≤n;

computing a respective bin value v for the respective data item by hashing data values of the identifier fields for the respective data item according to a third hash function $h_3$, different from $h_2$ and $h_1$, wherein the respective bin value indicates a respective data bin storing the respective data item; and updating the matrix B by computing B[r,c]=max(v,(B[r,c]);

receiving, from a client device, a request for an approximate distinct count of a query key value;

for each row i in the matrix B, computing a respective column c(i)=$h_2$ (query key value, i) in response to the request;

estimating a count of data items from the data stream whose data values for the set of query fields match the query key value according to the matrix entries B[1, $c_1$], B[2, $c_2$], ..., B[m, $c_m$] based at least on the respective computed column c(i) of each row i; and returning the estimated count of data items to the client device.

\* \* \* \* \*

UNITED STATES PATENT AND TRADEMARK OFFICE
CERTIFICATE OF CORRECTION

| | |
|---|---|
| PATENT NO. | : 11,061,916 B1 |
| APPLICATION NO. | : 16/664715 |
| DATED | : July 13, 2021 |
| INVENTOR(S) | : Ting |

It is certified that error appears in the above-identified patent and that said Letters Patent is hereby corrected as shown below:

In the Claims

Claim 1, Column 15, Line 15-16, please delete "processors and g memory" and insert --processors and a memory--;

Claim 13, Column 17, Lines 5-6, please delete "the estimating gf the count" and insert --the estimating of the count--;

Claim 14, Column 17, Lines 12-13, please delete "the estimating gf the count" and insert --the estimating of the count--;

Claim 20, Column 18, Line 17, please delete "function ha different from $h_1$," and insert --function $h_2$, different from $h_1$,--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*